United States Patent
Gabello et al.

(10) Patent No.: US 6,584,283 B2
(45) Date of Patent: Jun. 24, 2003

(54) LED ILLUMINATION DEVICE FOR A SCANNERLESS RANGE IMAGING SYSTEM

(75) Inventors: Louis R. Gabello, Rochester, NY (US); Dennis J. Whipple, Rochester, NY (US); Lawrence A. Ray, Rochester, NY (US); Kenneth J. Repich, Fairport, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/776,286

(22) Filed: Feb. 2, 2001

(65) Prior Publication Data

US 2002/0172514 A1 Nov. 21, 2002

(51) Int. Cl.⁷ .......................... G03B 15/03; G01C 3/08; H04N 7/18
(52) U.S. Cl. ...................... 396/109; 356/5.1; 356/5.15; 348/135
(58) Field of Search .................... 396/89, 109, 106; 356/5.05, 5.1, 5.15, 5.11, 5.12, 5.13, 5.14; 348/135

(56) References Cited

U.S. PATENT DOCUMENTS

| | | | |
|---|---|---|---|
| 4,891,624 A | 1/1990 | Ishikawa et al. | 340/436 |
| 4,935,616 A | 6/1990 | Scott | 250/213 |
| 5,877,851 A * | 3/1999 | Stann et al. | 356/5.09 |
| 6,088,086 A | 7/2000 | Muguira et al. | 356/5.15 |
| 6,118,946 A | 9/2000 | Ray et al. | 396/89 |

FOREIGN PATENT DOCUMENTS

| | | | |
|---|---|---|---|
| EP | 1 014 112 A2 | 6/2000 | G01S/17/89 |
| WO | WO 00/49332 | 8/2000 | F21S/2/00 |

OTHER PUBLICATIONS

"The Emerging Versatility of a Scannerless Range Imager" by John Sackos, Bart Bradley, Bob Nellums, and Carl Diegert. SPIE Proceedings, Apr. 8–12, 1006 (Orlando), vol. 2748, pp. 47–60.

"Innovative range imager sees how targets measure up: For smart weapons and civilian uses too" by Ken Frazier. Sandia Lab News, vol. 46, No. 19. Sep. 16, 1994.

"A Low–Cost, High–Resolution, Video–Rate Imaging Optical Radar" by J.T. Sackos, R.O. Nellums, S.M. Lebien, C.F. Diegert. Part of the SPIE Conference on Laser Radar Technology and Applications III, Orlando, FL, Apr. 1998, SPIE vol. 3380, pp. 327–342.

* cited by examiner

Primary Examiner—Russell Adams
Assistant Examiner—Arthur A Smith
(74) Attorney, Agent, or Firm—David M. Woods (57) ABSTRACT

A light emitting diode (LED) illumination device for generating modulated light for a scannerless range imaging system includes circuitry for generating a drive signal having a given phase and frequency characteristic; a plurality of light emitting diodes arranged in a plurality of LED banks, wherein each LED bank comprises a plurality of light emitting diodes connected in series to the circuitry to receive the drive signal; and a switching stage for simultaneously activating the plurality of LED banks such that the LED banks generate the modulated light according to the phase and frequency characteristics of the drive signal.

24 Claims, 11 Drawing Sheets

LED ILLUMINATION DEVICE FOR A SCANNERLESS RANGE IMAGING SYSTEM

FIELD OF THE INVENTION

The present invention relates to the field of three-dimensional image capture and in particular to a modulated illumination source used in the capture of image depth information with a scannerless range imaging system.

BACKGROUND OF THE INVENTION

Distance (or depth) information from a camera to objects in a scene can be obtained by using a scannerless range imaging system having a modulated illumination source and a modulated image receiver. In a method and apparatus described in U.S. Pat. No. 4,935,616, a scannerless range imaging system uses an amplitude-modulated high-power laser diode to simultaneously illuminate a target area. Conventional optics confine the target beam and image the target onto a receiver, which includes an integrating detector array sensor having hundreds of elements in each dimension. The range to a target is determined by measuring the phase shift of the reflected light from the target relative to the amplitude-modulated carrier phase of the transmitted light. To make this measurement, the gain of an image intensifier (in particular, a micro-channel plate) within the receiver is modulated at the same frequency as the transmitter, so the amount of light reaching the sensor (a charge-coupled device) is a function of the range-dependent phase difference. A second image is then taken without receiver or transmitter modulation and is used to eliminate non-range-carrying intensity information. Both captured images are registered spatially, and a digital processor is used to extract range data from these two frames. Consequently, the range associated with each pixel is essentially measured simultaneously across the whole scene.

A scannerless ranging system, such as the system described above, typically uses a laser for field illumination in order to capture depth information. Lasers are capable of high power and very high frequency modulation. However, a primary concern is eye safety, which requires proper safety glasses or alternatively requires the laser design to provide added protective measures, e.g., output radiant power limits, safe viewing distance, etc. To achieve sufficient powers of illumination for image capture, scannerless ranging systems use multimode lasers. Due to their nature, multimode laser diodes typically have significant spatial structure along with astigmatism, speckle and large width-to-height ratios (ellipticity) in the beam. As a result, large non-uniform regions can appear when using the beam to illuminate an object field. The spatial structure can also shift with varying temperatures and drive current. To overcome these effects, optical components, e.g., an anamorphic prism, are placed in the path of the illumination source to shape the beam and reduce ellipticity. Diffuser plates are also placed into the beam path to reduce spatial structure in the illumination, to provide beam spreading, and to comply with requirements for eye safety. Other optical components could also be used in lieu of a diffuser to produce beam uniformity and spreading. For long distances, the coherency property of a laser provides the advantage of maintaining low dispersion.

What is needed is an alternative to the use of laser diodes for depth capture to overcome some of the disadvantages presented by the use of a laser for field illumination, namely: the concern for eye safety, beam structure, speckle, additional optics and cost. Moreover, in the case of field illumination for closer range image capture (e.g., 40 feet or less), the coherency property of a laser is a disadvantage since beam spreading and good uniformity are desired, thus necessitating further optics. In consideration of power density, a single laser component does provide higher output power density (compared, e.g., to a single LED), however high current thresholds must be overcome to drive the laser.

As described in the Sandia Lab News (vol. 46, No. 19, Sep. 16, 1994), the scannerless range imaging system described in the '616 patent may alternatively use an array of amplitude-modulated light emitting diodes (LEDs) to completely illuminate a target scene. Eye exposure to an LED source illumination can be tolerated, as one might expect in a picture-taking scenario where eye sensitivity is present. However, the design for the modulated LED source poses a challenge, particularly as to the scalability and reliability of the design, as well as to operation at the required high modulating frequencies.

SUMMARY OF THE INVENTION

It is an object of the invention to provide a scannerless range imaging system that is capable of providing reliable illumination for closer range image capture.

A further objective of the invention is to provide improved eye safety in a scannerless range imaging system, particularly for closer range image capture.

A further object of the invention is to provide easily scalable, high frequency drive circuitry for an LED illumination source for a scannerless range imaging system.

The present invention is directed to overcoming one or more of the problems set forth above. Briefly summarized, according to one aspect of the present invention, a light emitting diode (LED) illumination device for generating modulated light for a scannerless range imaging system includes circuitry for generating a drive signal having a given phase and frequency characteristic; a plurality of light emitting diodes arranged in a plurality of LED banks, wherein each LED bank comprises a plurality of light emitting diodes connected in series to the circuitry to receive the drive signal; and a switching stage for simultaneously activating the plurality of LED banks such that the LED banks generate the modulated light according to the phase and frequency characteristics of the drive signal.

This invention provides an alternative to the use of laser diodes for depth capture, thereby overcoming some of the disadvantages presented by the use of a laser for field illumination, namely: eye safety, beam structure, speckle, high threshold currents, additional optics and cost.

These and other aspects, objects, features and advantages of the present invention will be more clearly understood and appreciated from a review of the following detailed description of the preferred embodiments and appended claims, and by reference to the accompanying drawings.

DETAILED DESCRIPTION OF THE INVENTION

Because range imaging devices employing laser illuminators and capture devices including image intensifiers and electronic sensors are well known, the present description will be directed in particular to elements forming part of, or cooperating more directly with, apparatus in accordance with the present invention. Elements not specifically shown or described herein may be selected from those known in the art. Certain aspects of the embodiments to be described may be provided in software. Given the system as shown and described according to the invention in the following materials, software not specifically shown, described or suggested herein that is useful for implementation of the invention is conventional and within the ordinary skill in such arts.

Figure 8:
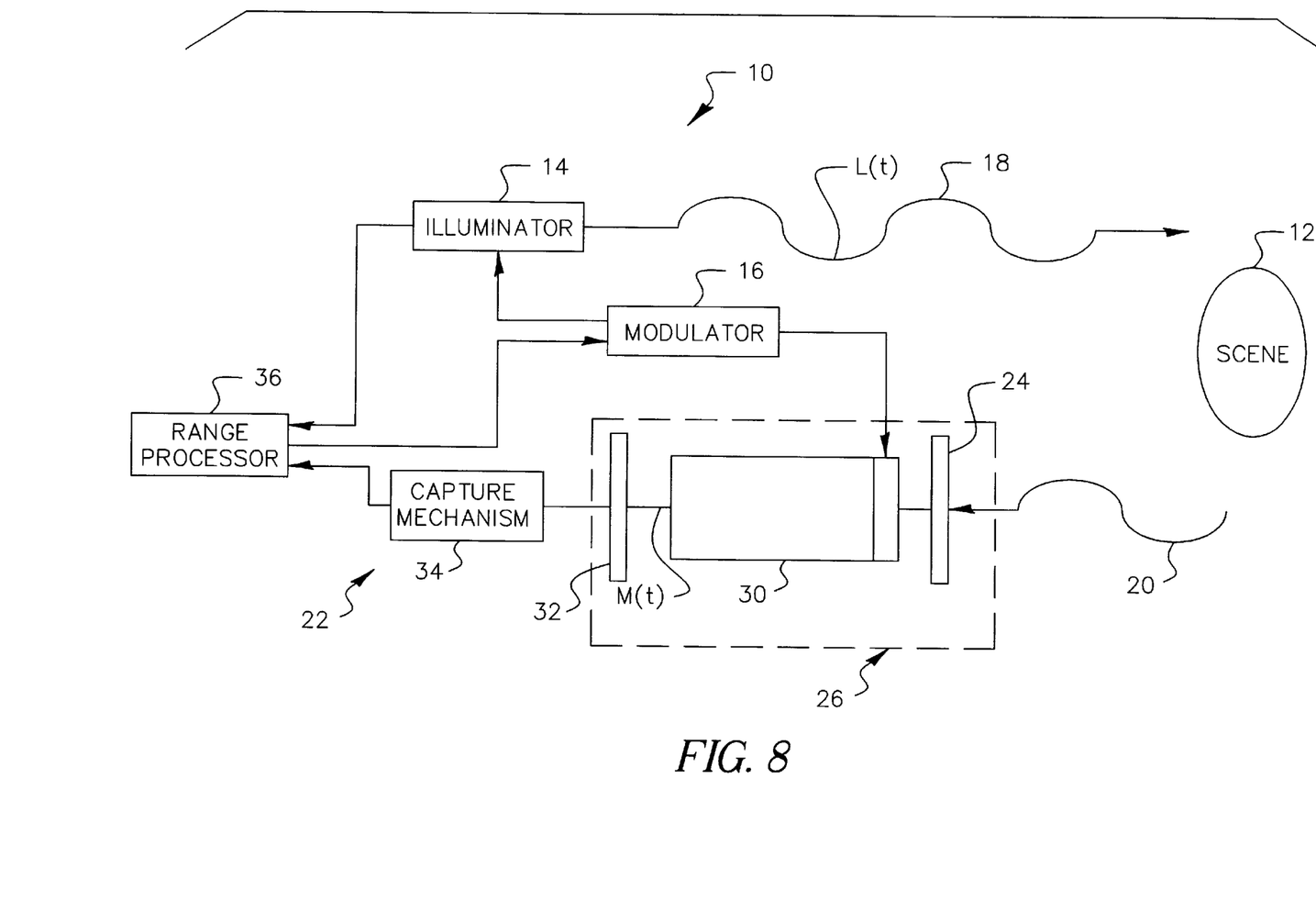
FIG. 8 is a block diagram of a known range imaging system which can be used to capture a bundle of images.

It is helpful to first review the principles and techniques involved in scannerless range imaging. Accordingly, referring first to FIG. 8, a range imaging system 10 is shown as a laser radar that is used to illuminate a scene 12 and then to capture an image bundle comprising a minimum of three images of the scene 12. An illuminator 14 emits a beam of electromagnetic radiation whose frequency is controlled by a modulator 16. Typically, in the prior art, the illuminator 14 is a laser device which includes an optical diffuser in order to effect a wide-field illumination. The modulator 16 provides an amplitude varying sinusoidal modulation. The modulated illumination source is modeled by:

$$L(t) = \mu_L + \eta \sin(2\pi\lambda t) \tag{Eq. 1}$$

where $\mu_L$ is the mean illumination, $\eta$ is the modulus of the illumination source, and $\lambda$ is the modulation frequency applied to the illuminator 14. The modulation frequency is sufficiently high (e.g., 12.5 MHz) to attain sufficiently accurate range estimates. The output beam 18 is directed toward the scene 12 and a reflected beam 20 is directed back toward a receiving section 22. As is well known, the reflected beam 20 is a delayed version of the transmitted output beam 18, with the amount of phase delay being a function of the distance of the scene 12 from the range imaging system. The reflected beam 20 strikes a photocathode 24 within an image intensifier 26, thereby producing a modulated electron stream proportional to the input amplitude variations. The output of the image intensifier 26 is modeled by:

$$M(t) = \mu_M + \gamma \sin(2\pi\lambda t) \tag{Eq. 2}$$

where $\mu_M$ is the mean intensification, $\gamma$ is the modulus of the intensification and $\lambda$ is the modulation frequency applied to the intensifier 26. The purpose of the image intensifier is not only to intensify the image, but also to act as a frequency mixer and shutter. Accordingly, the image intensifier 26 is connected to the modulator 16, causing the gain of a microchannel plate 30 to modulate. The electron stream from the photocathode 24 strikes the microchannel plate 30 and is mixed with a modulating signal from the modulator 16. The modulated electron stream is amplified through secondary emission by the microchannel plate 30. The intensified electron stream bombards a phosphor screen 32, which converts the energy into a visible light image. The intensified light image signal is captured by a capture mechanism 34, such as a charge-coupled device (CCD). The captured image signal is applied to a range processor 36 to determine the phase delay at each point in the scene. The phase delay term $\omega$ of an object at a range $\rho$ meters is given by:

$$\omega = \frac{2\rho\lambda}{c} \bmod 2\pi \tag{Eq. 3}$$

where c is the velocity of light in a vacuum. Consequently, the reflected light at this point is modeled by:

$$R(t) = \mu_L + \kappa \sin(2\pi\lambda t + \omega) \tag{Eq. 4}$$

where $\kappa$ is the modulus of illumination reflected from the object. The pixel response P at this point is an integration of the reflected light and the effect of the intensification:

$$P = \int_0^{2\pi} R(t)M(t)dt = 2\mu_L\mu_M + \kappa\pi\gamma\cos(\omega) \tag{Eq. 5}$$

In the range imaging system disclosed in the aforementioned '616 patent, a reference image is captured during which time the micro-channel plate is not modulated, but rather kept at a mean response. The range is estimated for each pixel by recovering the phase term as a function of the value of the pixel in the reference image and the phase image.

A preferred, more robust approach for recovering the phase term is described in U.S. Pat. No. 6,118,946, entitled "Method and Apparatus for Scannerless Range Image Capture Using Photographic Film", which is incorporated herein by reference. Instead of collecting a phase image and a reference image, this approach collects at least three phase images (referred to as an image bundle). This approach shifts the phase of the intensifier 26 relative to the phase of the illuminator 14, and each of the phase images has a distinct phase offset. For this purpose, the range processor 36 is suitably connected to control the phase offset of the modulator 16, as well as the average illumination level and such other capture functions as may be necessary. If the image intensifier 26 (or laser illuminator 14) is phase shifted by $\theta_i$, the pixel response from equation (5) becomes:

$$P_i = 2\mu_L\mu_M\pi + \kappa\pi\gamma\cos(\omega + \theta_i) \tag{Eq. 6}$$

It is desired to extract the phase term $\omega$ from the expression. However, this term is not directly accessible from a single image. In equation (6) there are three unknown values and the form of the equation is quite simple. As a result, mathematically only three samples (from three images) are required to retrieve an estimate of the phase term, which is proportional to the distance of an object in the scene from the imaging system. Therefore, a set of three images captured with unique phase shifts is sufficient to determine $\omega$.

For simplicity, the phase shifts are given by $\theta_k=2\pi k/3$; k=0, 1, 2. In the following description, an image bundle shall be understood to constitute a collection of images which are of the same scene, but with each image having a distinct phase offset obtained from the modulation applied to the intensifier 26. It should also be understood that an analogous analysis can be performed by phase shifting the illuminator 14 instead of the intensifier 26. If an image bundle comprising more than three images is captured, then the estimates of range can be enhanced by a least squares analysis using a singular value decomposition (see, e.g., W. H. Press, B. P. Flannery, S. A. Teukolsky and W. T. Vetterling, *Numerical Recipes (the Art of Scientific Computing)*, Cambridge University Press, Cambridge, 1986).

If images are captured with $n \geq 3$ distinct phase offsets of the intensifier (or laser or a combination of both) these images form an image bundle. Applying Equation (6) to each image in the image bundle and expanding the cosine term (i.e., $P_i = 2\mu_L\mu_M\pi + \kappa\pi\gamma \ (\cos(\omega)\cos(\theta_i) - \sin(\omega)\sin(\theta_i))$) results in the following system of linear equations in n unknowns at each point:

$$\begin{pmatrix} P_1 \\ P_2 \\ \vdots \\ P_n \end{pmatrix} = \begin{pmatrix} 1 & \cos\theta_1 & -\sin\theta_1 \\ 1 & \cos\theta_2 & -\sin\theta_2 \\ \vdots & \vdots & \vdots \\ 1 & \cos\theta_n & -\sin\theta_n \end{pmatrix} \begin{pmatrix} \Lambda_1 \\ \Lambda_2 \\ \Lambda_3 \end{pmatrix} \quad \text{(Eq. 7)}$$

where $\Lambda_1 = 2\mu_L\mu_M\pi$, $\Lambda_2 = \kappa\pi\gamma \cos\omega$, and $\Lambda_3 = \kappa\pi\gamma \sin\omega$. This system of equations is solved by a singular value decomposition to yield the vector $\Lambda = [\Lambda_1, \Lambda_2, \Lambda_3]^T$. Since this calculation is carried out at every (x, y) location in the image bundle, $\Lambda$ is really a vector image containing a three element vector at every point. The phase term $\omega$ is computed at each point using a four-quadrant arctangent calculation:

$$\omega = \tan^{-1}(\Lambda_3, \Lambda_2) \quad \text{(Eq. 8)}$$

The resulting collection of phase values at each point forms the phase image. Once phase has been determined, range r can be calculated by:

$$r = \omega \frac{c}{4\pi\lambda} \quad \text{(Eq. 9)}$$

Equations (1)–(9) thus describe a method of estimating range using an image bundle with at least three images (i.e., n=3) corresponding to distinct phase offsets of the intensifier and/or illuminator.

Figure 1:
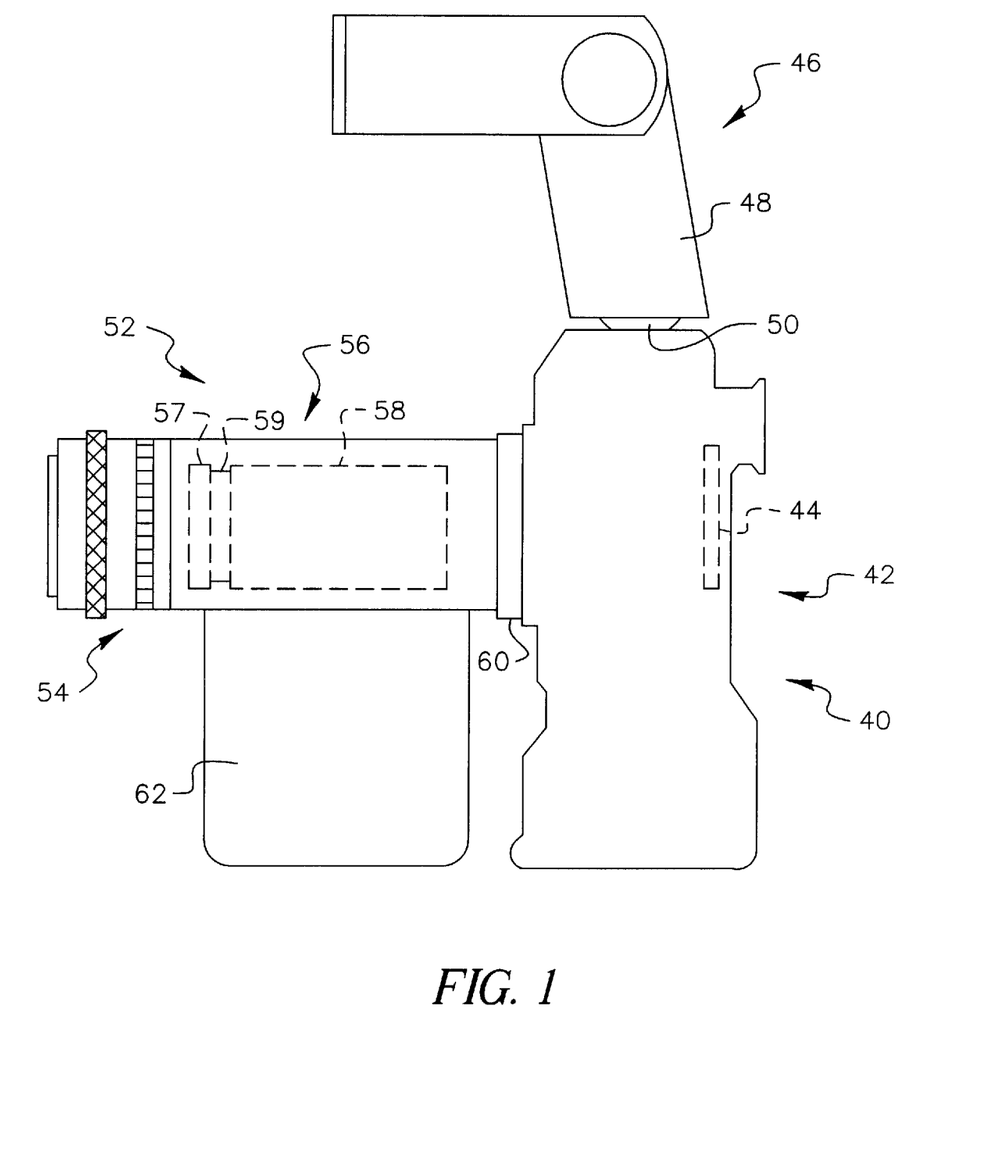
FIG. 1 shows the main components of a scannerless range imaging system in accordance with the invention.

Referring now to FIG. 1, the overall scannerless range imaging system is shown to comprise four main components in accordance with the present invention. The first component is an image capture device 40, preferably a single lens reflex (SLR) camera body 42 having an image capture element 44; a typical capture element could be a photosensitive film (which would be used in a range imaging system as described in the aforementioned U.S. Pat. No. 6,118,946) or an electronic sensor, such as a charged-coupled-device (CCD). The image capture device 40 is able to capture a plurality of range images, i.e., the aforementioned bundle of images. Typically, for an electronic image capture element, the image capture device 40 would include image storage means (not shown) to store all the range images in the image bundle, as well as, e.g., a color texture image in addition to the range images. This storage can be accomplished by an on-camera storage means, such as a an internal memory together with output connections to, e.g., a PCMCIA card or a floppy disk (not shown) for receiving images from the internal memory. Also, a means for advancing, or driving, the image capture device 40 to prepare for a successive image capture must be available. Such capabilities are well known in relation to such image capture devices, and will not be described in detail.

The second component is an illumination device 46 for producing high-frequency amplitude modulated illumination of a desired average amplitude, amplitude modulus and frequency. Preferably, the illumination device 46 is configured as a removable unit 48 that is attached to the camera body 42 via a conventional hot shoe connection 50. It is also desirable that the illumination device 46 includes the capability of shifting the phase of the amplitude modulation between a set of prescribed phase offsets (alternatively, this function may be performed by modulation of the reflected illumination in the optical portion of the scannerless range imaging system). It is also useful for the illumination device 46 to have a preferred operating wavelength, such as in the infrared region of the spectrum.

The illumination device 46 has the primary purpose of producing amplitude-modulated illumination with its phase controllable for generating a shift in the transmitted wave pattern for each range image in the image bundle (although, as mentioned before, this function may be performed by modulation of the reflected illumination). As will be explained in detail later, the illumination device 46 includes a light emitting diode (LED) light source and a modulation circuit for generating the requisite modulation signals of predetermined frequency with a set of predetermined phase offsets. The LED light source is preferably modulated at a modulation frequency of about 12.5 megahertz and the preferred phase offsets, as mentioned earlier are phase shifts $\theta$ in each range image given by $\theta_k=2\pi k/3$; k=0, 1, 2. Although the LED light need not necessarily be uniformly distributed, a controlled angle diffusion sheet, such as the Light Shaping Diffuser® from Physical Optics Corporation, is positioned in front of the light source in order to spread the modulated light across the desired field of view as uniformly as possible.

Figure 10:
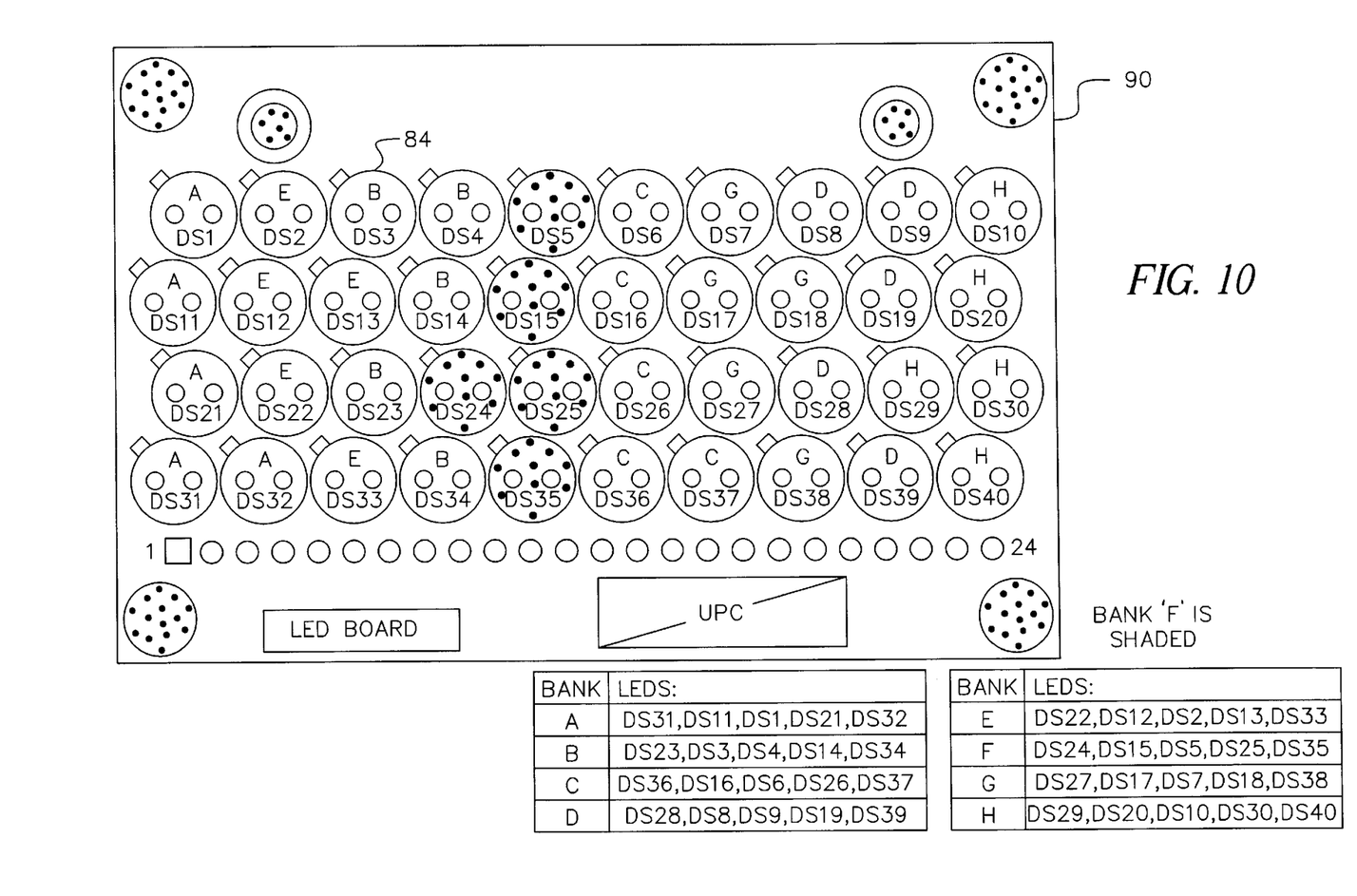
FIG. 10 is a diagram of a non-distributed layout of LEDs, as provided in another embodiment of the illumination section shown in FIG. 3.
Figure 11A:
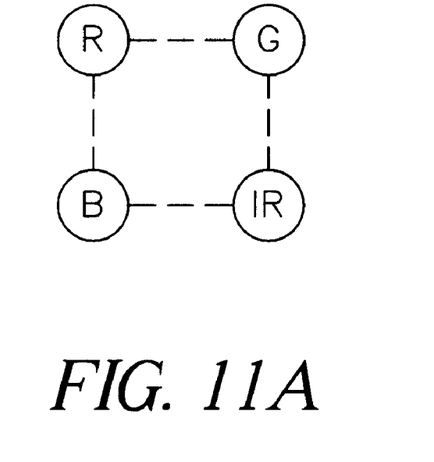
FIGS. 11A and 11B show diagrams of two arrangements of RGB and IR LEDs that provide both wide band illumination for capturing an intensity image and modulated illumination for capturing a range image.
Figure 11B:
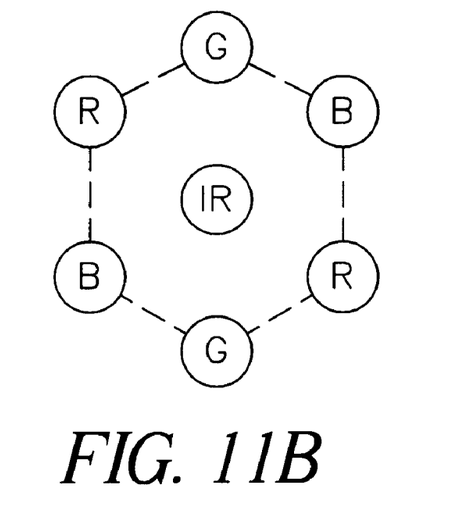

The illumination device 46 may also include a standard wide-band illumination source that is not modulated. This illumination source is used for intensity (non-ranging) photographic images, and may be based on a commonly known and understood flash of a standard camera system, e.g., a commonly available electronic flash of the type useful with photographic cameras. Alternatively, the intensity illumination could be provided by separate LEDs, e.g., red, green and blue LEDs, that are chosen so as to provide a white illumination similar to an electronic flash. One approach would be to cluster the RGB LEDs in and around each modulated (IR) LED used for ranging. There are many possibilities for such "clustering"; for example, as shown in FIG. 11A, an LED cluster could be constituted by one each of RGB and IR LEDs. Or, as shown in FIG. 11B, RGB LEDs could be clustered around each IR LED in a hexagonal layout. In either case, the layout shown would be replicated as necessary to provide the needed illumination. Source color temperature could be controlled by the current through each color group. And, whatever the layout, it would be superimposed upon the layouts that will be described for the modulated (IR) LEDs in connection with FIGS. 9 and 10. In any of these embodiments, the illumination device 46 would operate in either of the following modes: a) a first mode in which the light source is operated to illuminate the scene with a plurality (bundle) of exposures, each with a unique phase offset applied to its modulated frequency; and b) a second mode in which the standard wide-band illumination device is operated during capture of an intensity image, e.g., a color texture image. If ambient light is sufficient, of course, it may be unnecessary for the illumination device to operate in the second mode in order to capture an intensity image; in that case, the image capture device would be instructed to operate without flash. Moreover, the sequence of image capture may be reversed, that is, the second mode may be engaged before the first mode or, indeed, the second mode might in specific situations be engaged between the several exposures of the first mode.

The third component is an optical assembly 52, which includes a lens 54 and a depth capture optical tube 56. The optical tube 56 incorporates a modulating element 58, such as the intensifier 26 (see FIG. 8), for modulating the incoming reflected scene light that is directed toward the capture element 44 in the camera body 42. The optical tube 56 also includes an IR bandpass filter 59 in order to eliminate background illumination, and may incorporate other optomechanical elements, such as a shutter 57. (If the range imaging system is further capable of capturing an intensity image, e.g., a color texture image, then the IR bandpass filter 59 would be removed or bypassed for that capture.) The optical assembly 52 is shown as a removable optical element that is connected to the image capture device 40 by means of a lens mount 60 on the camera body 42. This is to further emphasize that the image capture device 40 may be based on a conventional camera body that could otherwise be fitted with a standard family of lenses for conventional photography.

The fourth component is a controller 62, which manages the overall image capture process of the range imaging system, including the operation of the illumination device 46, the image capture device 40, and the optical assembly 52. For instance, the controller 62 includes the necessary drivers and other circuitry (not shown) for operating the modulating element 58 in proper synchronism with an image capture event. (It should also be apparent that the controller 62 could be part of, or attached to, the camera body 42, and the necessary electrical linkages to the optical assembly could be made directly through the camera body 42, e.g., through contacts in the lens mount 60.

Figure 2:
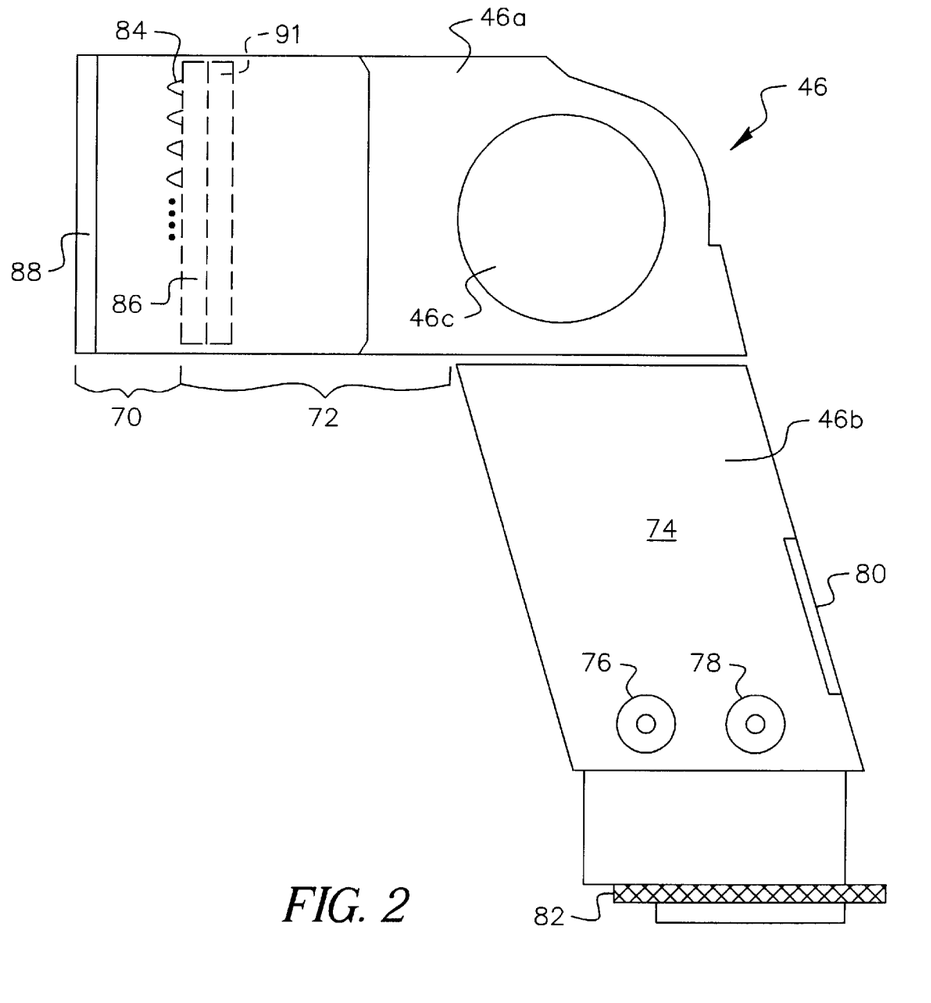
FIG. 2 shows the primary assemblies of the LED illumination device shown in FIG. 1.

As shown in FIG. 2, the illumination device 46 comprises three primary assemblies: an illumination section 70, an LED driver stage 72 and a power and control interface 74. The illumination device 46 also includes electrical connectors 76 and 78 for an exposure control signal input and a power input, a display and user control section 80 for displaying status indicators and providing one or more switches for on/off and other functions, and a camera mount 82 for attaching the device 46 to the hot shoe connector 50 on the camera body 42. In addition, the illumination device 46 may be configured in two connected parts 46a and 46b, where the upper part 46a with the illumination section 70 can articulate about a pivot 46c for better aiming, etc. The entire illumination device 46 is intended to be a self contained unit that attaches to the hot shoe connector 50 of the camera body 42 via the camera mount 82. This is to further emphasize that the illumination device 46 may be based on a conventional flash body that could be fitted to a standard camera body.

Figure 3:
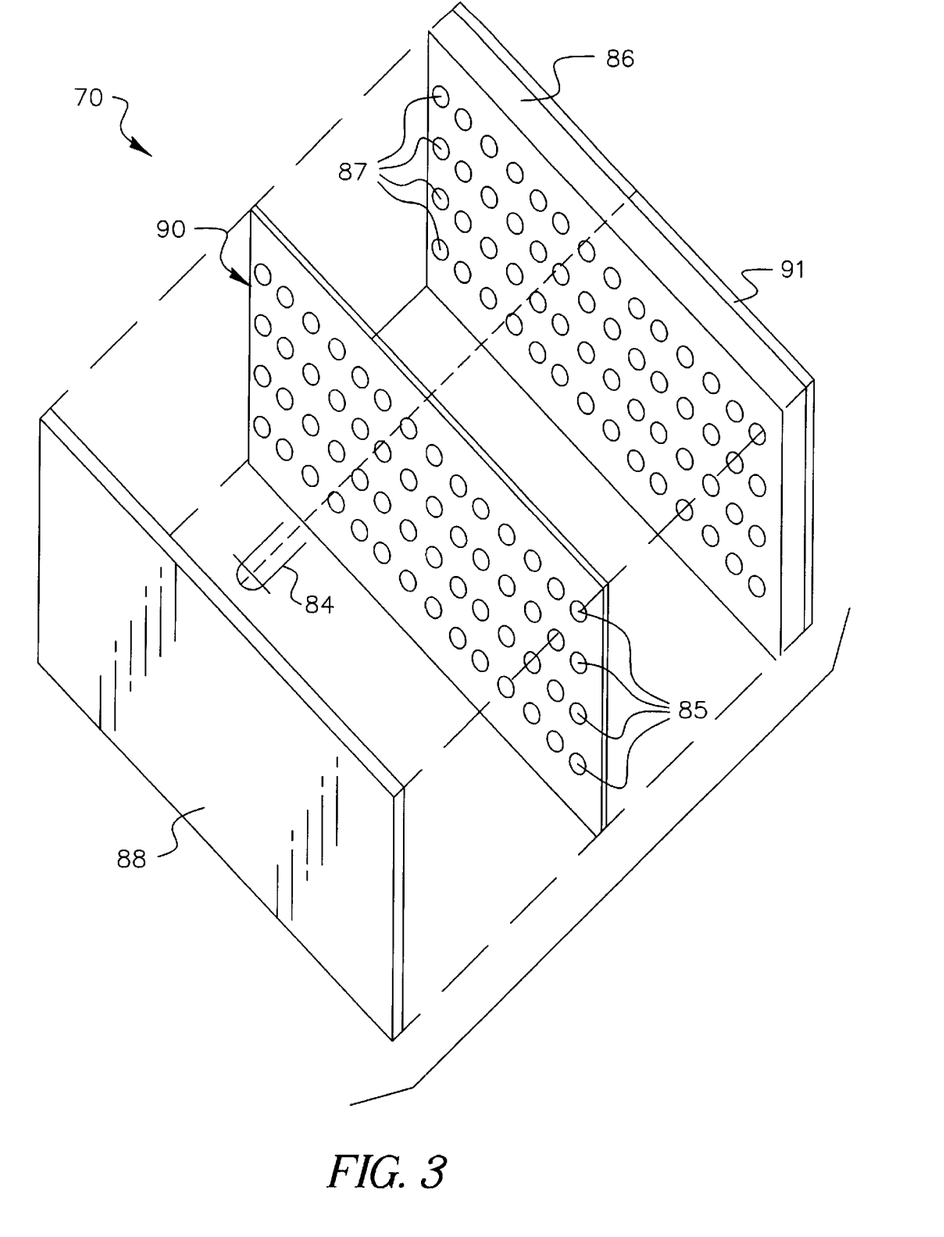
FIG. 3 is a diagram of the illumination section of the LED illumination device shown in FIG. 2.

Referring to FIGS. 2 and 3, the illumination section 70 contains a plurality of light emitting diodes (LEDs) 84 mounted onto a heat sink (copper bar) 86, a diffuser plate 88 (preferably a Holographic Light Shaping Diffuser® from Physical Optics Corporation) at the illumination exit port of the illumination section 70, and a thin layer of insulation material 90 (preferably a material identified as Sil-PAD™ available from Bergquist Co., Chanhassen, Minn.) placed between the diodes 84 and the copper heat sink 86 to provide electrical isolation and good thermal conductivity. The circuit traces connecting the LEDs are completed on a printed circuit board 91 on the backside of the heat sink 86. At the present time, infrared LEDs are available (e.g. part number CLE330E from Clairex Technologies Inc., which have a peak emission at 850 nm.) which can be modulated at frequencies sufficient for depth capture (e.g. 12.5 MHz.). High current threshold is not an issue with LEDs, which can provide illumination from a very low current (10's of milliamperes) to a high continuous current (100 milliamperes) to a very high current (amperes) in a pulsed mode. Moreover, the non-coherency property of the LED provides inherent dispersion that can be controlled using simple lenses mounted directly onto the LED at the time of manufacturing.

Ample illumination is obtained by using multiple LEDs. While only one LED 84 is shown in FIG. 3 for clarity of illustration, it should be understood that a plurality of LEDs are mounted through four rows 85 and 87 of hole perforations in the insulation material 90 and the heat sink 86, respectively. In the preferred embodiment, five LED diodes, which are termed an "LED bank", are connected together on the printed circuit board 91 to operate in series; eight banks (i.e., forty LEDs) are contained in the illumination device 46. Grouping the LEDs 84 in this fashion provides a good compromise between the number of driver circuits required and the driver capability. Nonetheless, these numbers of LEDs and banks are not to be seen as limitations, and a greater or fewer number of diodes, or diodes per bank, may be used in other embodiments according to the invention.

Figure 9:
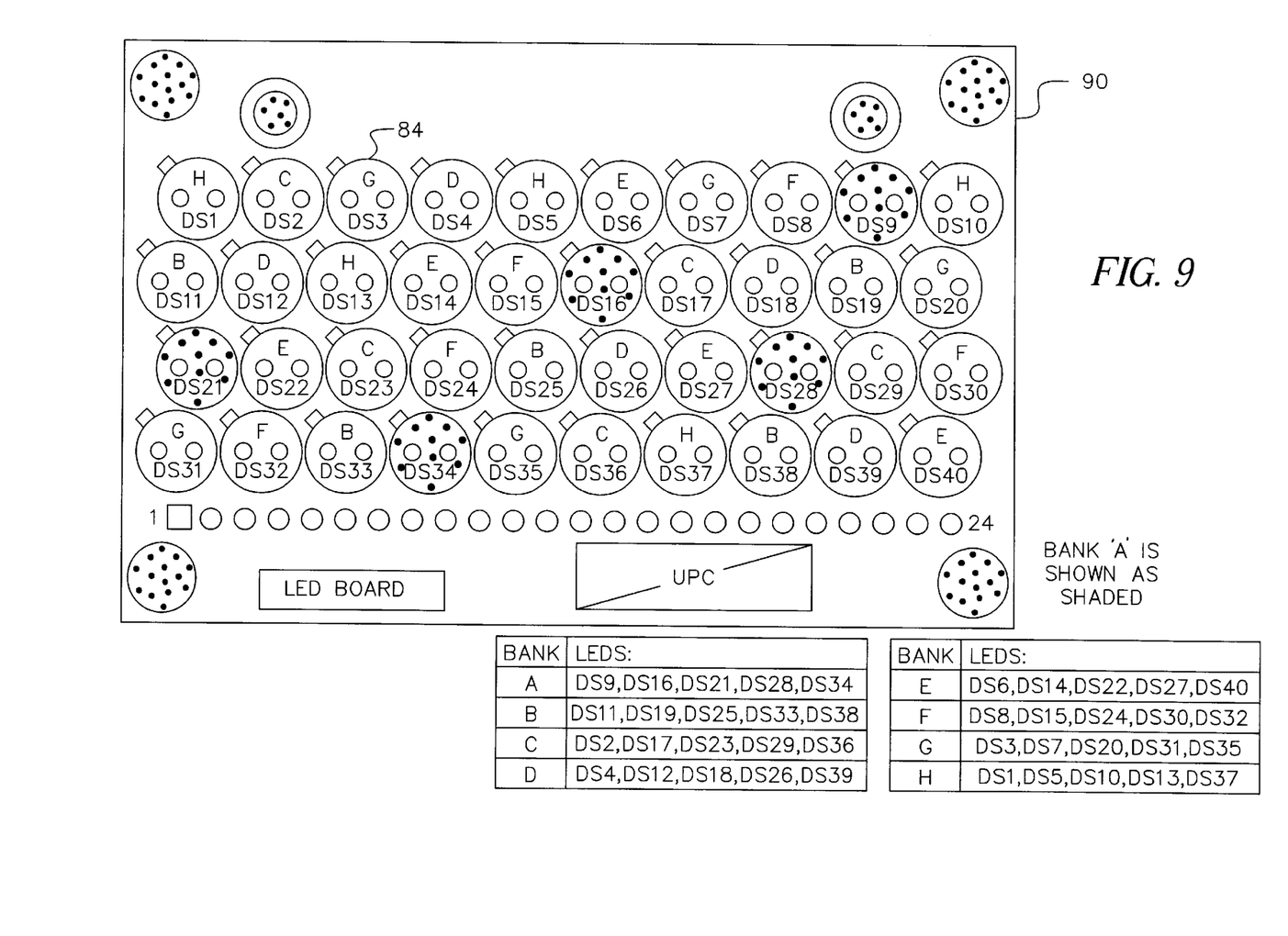
FIG. 9 is a diagram of a distributed layout of LEDs, as provided in one embodiment of the illumination section shown in FIG. 3.

In a distributed LED layout as shown in FIG. 9 for eight banks A–H, the LED diodes 84 are mounted on the circuit board 90 in a dispersed fashion so that a bank failure would have minimal impact on the distribution of the illumination. On the other hand, in a non-distributed LED layout as shown in FIG. 10 for eight banks A–H, the LED diodes 84 are mounted in a regular pattern, which is helpful in more easily maintaining uniform trace lengths and thereby avoiding any phase discrepancy between the LED banks. In either case, as shown in both FIGS. 9 and 10, rows of LED diodes 84 are arranged using an offset placement pattern to provide more uniform distribution of the output illumination. The radiating full angle provides wide and reasonably uniform field illumination, especially at a short distance. The diffuser 88 is used to provide an additional but small amount of diffusion (10°) of the LED output; this further enhances uniformity for close field illumination. The diffuser material also provides protection for the interior of the illumination compartment, which encases the LED driver circuitry.

Figure 4:
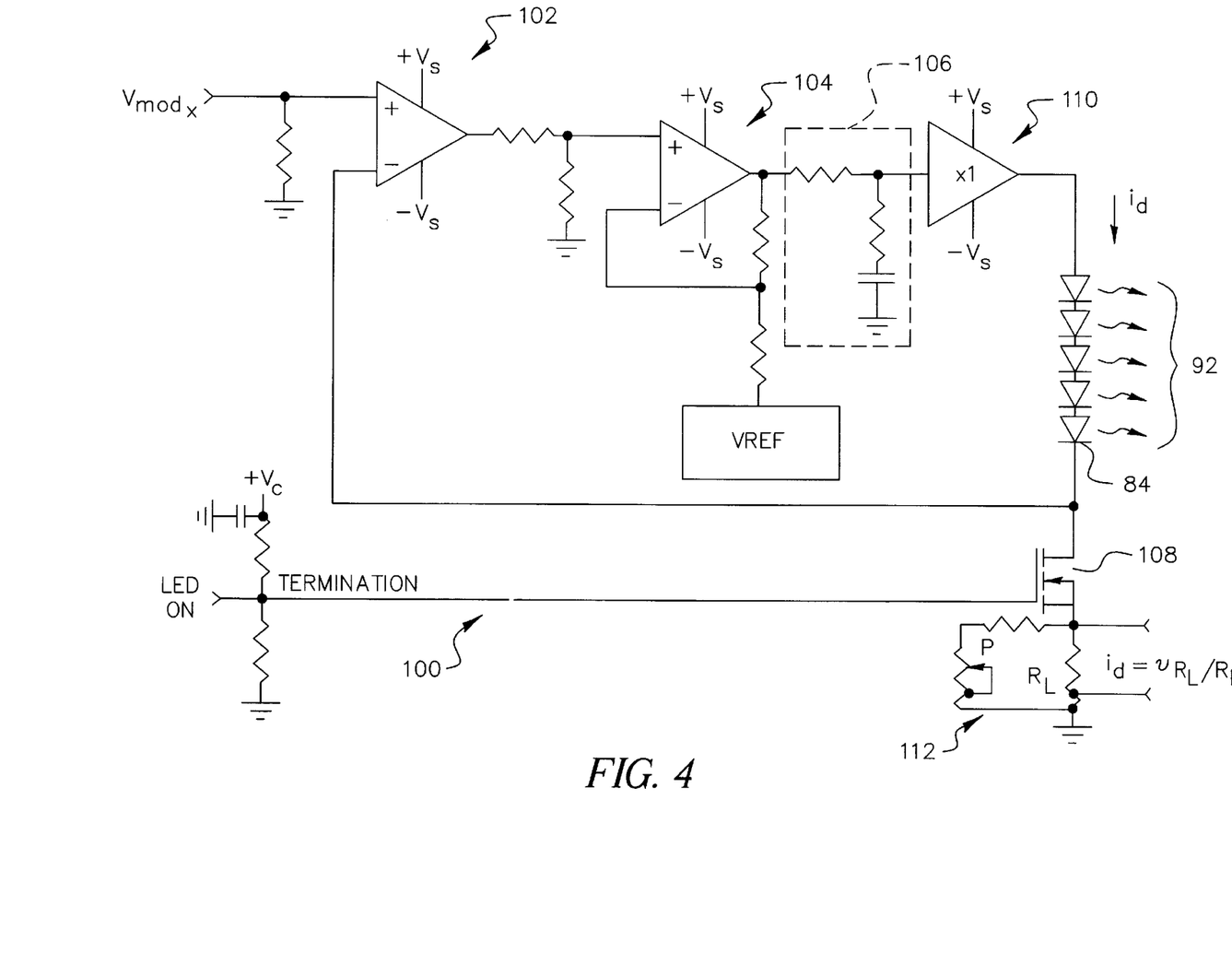
FIG. 4 is a diagram of the LED driver circuitry of the LED illumination device shown in FIG. 2.

Referring to FIG. 4, an LED driver circuit 100 provides controlled current drive for a bank 92 of LEDs 84. Eight of these driver circuits 100 are contained within the LED driver section 72 of the illumination device 46 in order to drive eight banks of LEDs. Current through each of the LEDs 84 in the bank 92, which is the same due to the series arrangement, is established via the input voltage $Vmod_x$ to a first stage amplifier 102. The input voltage $Vmod_x$ controls the level of illumination generated by the bank of LEDs, i.e., both as to the mean level and the peak to peak modulation. A second stage amplifier 104, using the reference voltage Vref, overcomes the offset forward bias needed by the LEDs, which is approximately +8.5 Vdc depending upon the diodes chosen and the operating current through the diodes. The effective gain on the first stage 102 is approximately 16 depending upon the diodes and trim circuit 112. By using a second amplifier stage 104, the dynamic range of the first stage is preserved for the range of the amplified output, that is, ~16×Vmod$_x$. An R-C network 106 provides pole-zero compensation for loop stability and a unity gain buffer amplifier 110 delivers the high current needed to drive the LED bank 92. A trim potentiometer P in a current trim circuit 112 provides a limited adjustment in the load resistor R$_L$, such that the LED banks 92 have matching diode radiance for a given input voltage Vmod$_x$. A FET switch 108 controls the on/off state of the LED bank 92 in response to an LED On signal derived within the power and control interface circuitry 74. The bank 92 is turned on during the exposure period of the camera and gated off otherwise; in this embodiment, the bank 92 is also gated on during camera focus.

Figure 5:
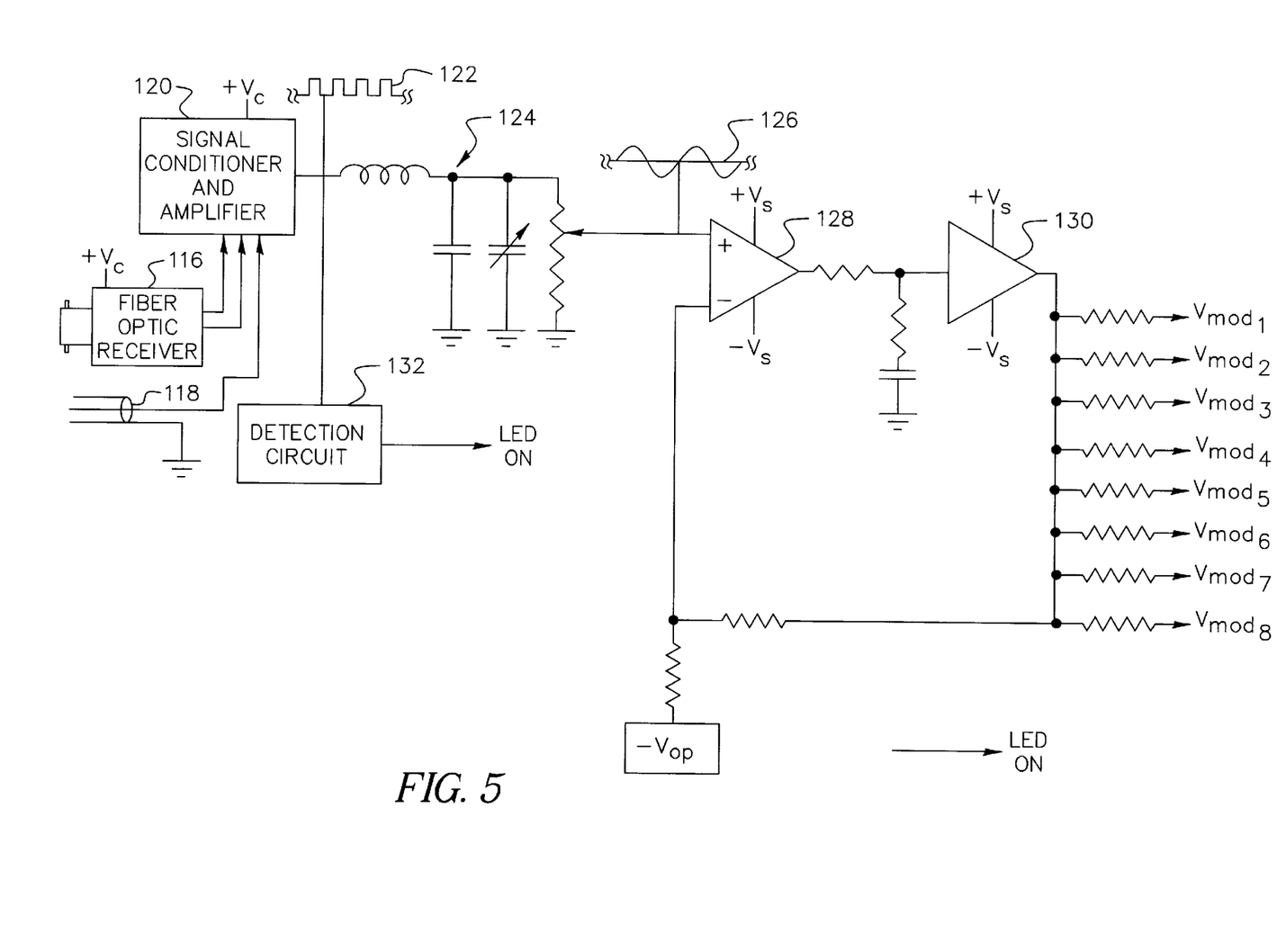
FIG. 5 is a diagram of the interface circuitry of the LED illumination device shown in FIG. 2.
Figure 6A:
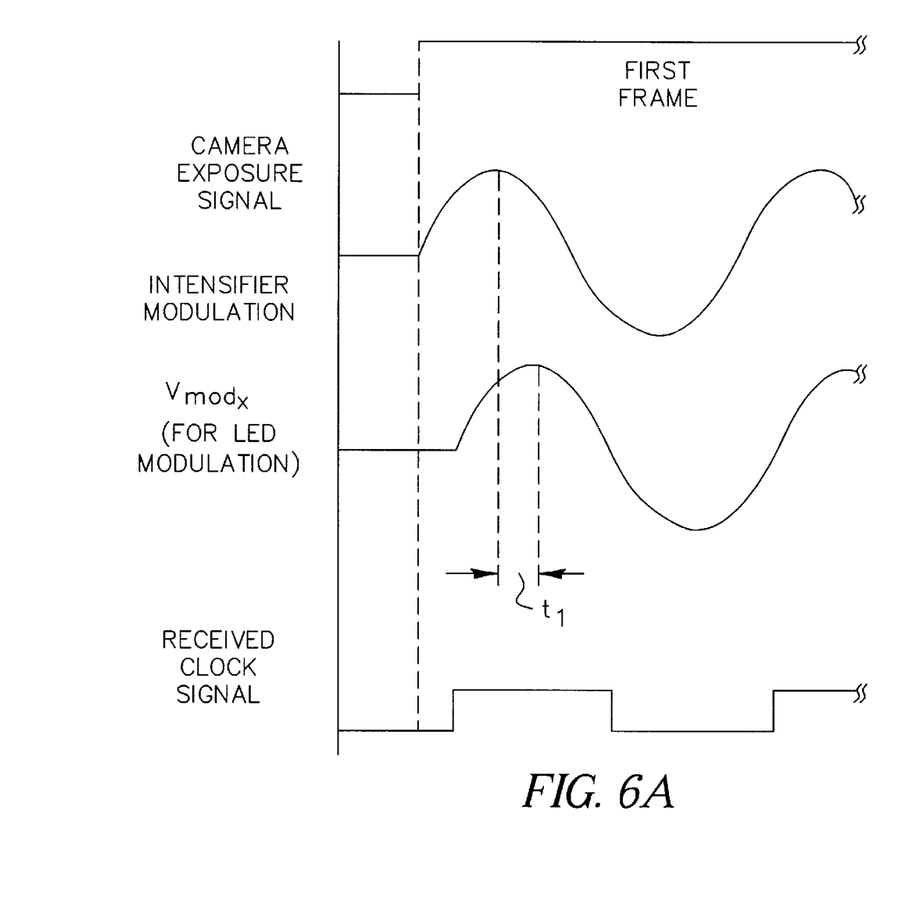
FIGS. 6A and 6B illustrate timing diagrams for two consecutive frames with shifted phases, as generated by the interface circuitry shown in FIG. 5.
Figure 6B:
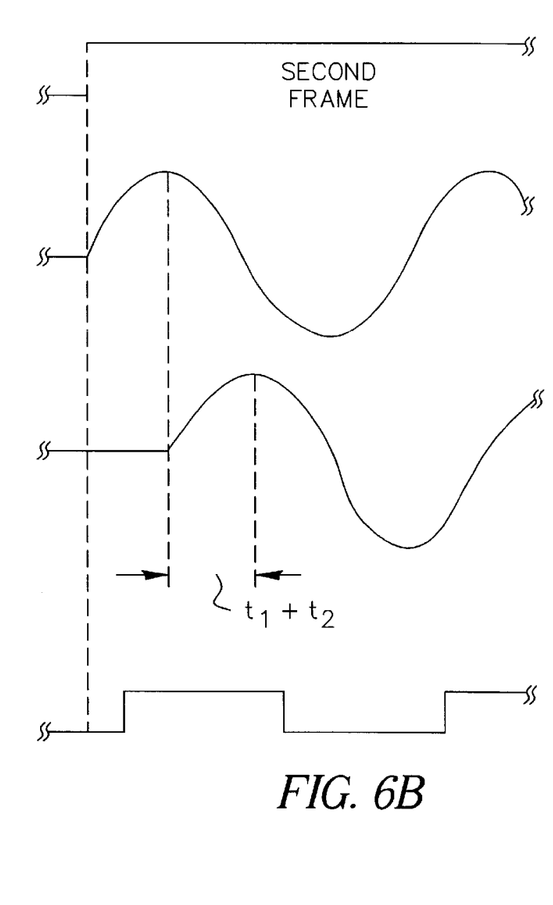

Referring to FIGS. 5 and 6, the interface portion of the circuitry 74 establishes the on state of all LED banks 92 in response to a received exposure control signal input to the illumination device 46 through the exposure control signal input connection 76 (see FIG. 2). This exposure control signal is based on a clock signal generated by the controller 62 (see FIG. 1) when the controller references an actual camera exposure signal (the "camera exposure signal" shown in FIGS. 6A and 6B) generated by the camera body 42 at the beginning of an exposure period. The exposure control signal may either be optically coupled through a fiber optic receiver 116 or wire coupled through a coax connector 118. The optical coupling enables control of the light illumination device 46 either locally or remotely while providing good common mode immunity to system noise. The exposure control signal is coupled to a signal conditioner and amplifier 120, which functions as a differential receiver, particularly for the differential fiber optic signal, and produces a clock signal 122 (the "received clock signal" shown in FIGS. 6A and 6B). The duration of the exposure control signal is equal to the exposure period with the addition of a 12 ms precursor time interval. The precursor time interval is established by firmware within the camera itself. The precursor interval accommodates the initiation of electrical-mechanical operations, such as shutter opening in the depth capture optical tube 56, prior to image exposure. Following the initial 12 ms, the received clock signal 122 is active for the duration of the exposure time established by the camera, as indicated by the camera exposure signal seen in FIGS. 6A and 6B.

The received clock signal 122 appears as a 12.5 MHz. clock occurring for the duration of the input exposure control signal. From this clock signal, the interface circuit generates the input modulation signal Vmod$_x$ used to drive the eight LED banks 92. The input clock signal also performs the following functions: a) it establishes the modulation frequency (e.g. 12.5 MHz.) of Vmod$_x$; b) it activates the output illumination of the illumination section 70 for the duration of the exposure; and c) it controls the change in phase shift (e.g., the earlier explained phase shifts given by $\theta_k = 2\pi k/3$; k=0, 1, 2.) of the output illumination modulation with respect to the phase of the intensifier modulation (the "intensifier modulation" waveform shown in FIGS. 6A and 6B). These phase shifts are provided by the controller 62 in response to the received exposure control signal. (The intensifier modulation signal shown in FIGS. 6A and 6B is the modulation signal applied to the intensifier 26 shown in FIG. 8.)

The clock signal 122 is filtered through a resonant LC filter 124 and produces a sinusoidal output voltage 126. The sinusoidal signal 126, when added in a summing amplifier 128 to a selected dc offset voltage V$_{op}$ becomes the controlling voltage for the LED bank 92, i.e. the voltage signal Vmod$_x$. The level of LED illumination follows Vmod$_x$, both in amplitude and phase. As shown in the timing diagrams of FIGS. 6A and 6B, the input clock phase of Vmod$_x$ is shifted with respect to the phase of the intensifier modulation in accordance with preset phase increment values, as explained in connection with FIG. 8. (An additional inherent phase delay t$_1$ could exist due to the electronics.) An example of the controlled phase increment is 10 nanoseconds, which relates to a π/4 (45°) phase shift given a 12.5 MHz. clock (80 nanoseconds period). More specifically, FIG. 6B shows the phase of input voltage signal Vmod$_x$ for the second frame shifted by t$_2$ relative to the first frame shown in FIG. 6A.

The interface circuitry 74 activates the LED bank 92 only when the transmitted modulation signal is sufficiently present. As shown in FIG. 5, a detection circuit 132 monitors the received clock signal 122. If the received clock signal 122 is present for more than a predetermined time period (e.g., 1.28 μs or 16 clock cycles), the detection circuit 132 generates the LED On signal and the LED drive current is activated (see FIG. 4); if the received clock signal 122 is absent for a predetermined time (e.g., 0.16 μs or 2 clock cycles), the detection circuit 132 disables the LED On signal and the LED drive current is deactivated. The detection circuit can take a variety of conventional forms, such as a logical counter, an R-C network with a comparator, or one-shot circuitry, depending upon the precision needed.

Figure 7:
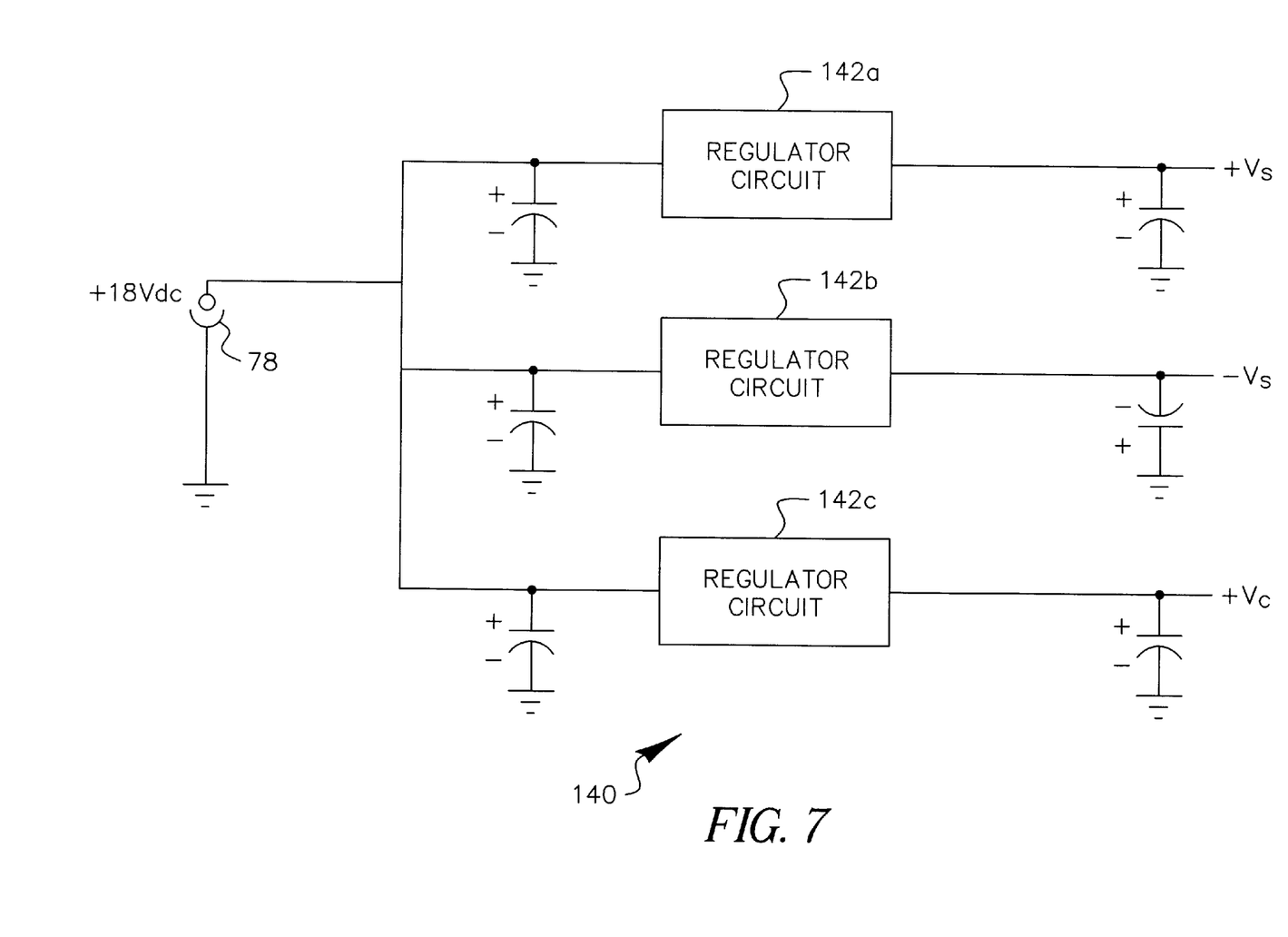
FIG. 7 is a diagram of the power conditioning circuitry of the LED illumination device shown in FIG. 2.

Referring to FIG. 7, the power and control interface circuitry 74 includes power conditioning circuitry 140, which receives an external supply (e.g., +18 Vdc) through the power input connector 78. Then, through the use of internal regulators 142a, 142b and 142c, the power conditioning circuitry 140 establishes the +/– dc supplies (e.g., +V$_s$, –V$_s$, +V$_c$) needed for the other circuitry in the illumination circuit 46. Levels for the three supplies are typically +15 Vdc, –15 Vdc, +5 Vdc, respectively. Since the supply regulation is conventional, the particular designs for conditioning and regulation of the supplies are readily understood by one of ordinary skill in this art and will not be further described.

The invention has been described with reference to one or more preferred embodiments. However, it will be appreciated that variations and modifications can be effected by a person of ordinary skill in the art without departing from the scope of the invention.

| PARTS LIST | |
|---|---|
| 10 | range imaging system |
| 12 | scene |
| 14 | illuminator |
| 16 | modulator |
| 18 | output beam |
| 20 | reflected beam |
| 22 | receiving section |
| 24 | photocathode |
| 26 | image intensifier |
| 30 | microchannel plate |
| 32 | phosphor screen |
| 34 | capture mechanism |
| 36 | range processor |
| 40 | image capture device |
| 42 | camera body |
| 44 | image capture element |
| 46 | illumination device |
| 46a | upper part |
| 46b | lower part |

-continued

PARTS LIST

| | |
|---|---|
| 46c | pivot |
| 48 | removable unit |
| 50 | hot shoe connection |
| 52 | optical assembly |
| 54 | lens |
| 56 | optical tube |
| 57 | shutter |
| 58 | modulating element |
| 59 | IR bandpass filter |
| 60 | lens mount |
| 62 | controller |
| 70 | illumination section |
| 72 | LED driver stage |
| 74 | power and control interface |
| 76 | connector |
| 78 | connector |
| 80 | display and user control section |
| 82 | camera mount |
| 84 | light emitting diode(s) |
| 85 | rows |
| 86 | heat sink |
| 87 | rows |
| 88 | diffuser plate |
| 90 | insulation material |
| 91 | printed circuit board |
| 92 | LED bank |
| 100 | LED driver circuit |
| 102 | first stage amplifier |
| 104 | second stage amplifier |
| 106 | R-C network |
| 108 | FET switch |
| 110 | unity gain amplifier |
| 112 | current trim circuit |
| 116 | fiber optic receiver |
| 118 | coax connector |
| 120 | signal conditioner and amplifier |
| 122 | received clock signal |
| 124 | resonant LC filter |
| 126 | sinusoidal output signal |
| 128 | summing amplifier |
| 130 | unity gain buffer amplifier |
| 132 | detection circuit |
| 140 | power conditioning circuitry |
| 142a | regulator circuit |
| 142b | regulator circuit |
| 142c | regulator circuit |

What is claimed is:

1. A light emitting diode (LED) illumination device for generating modulated light for a scannerless range imaging system, said illumination device comprising:
   circuitry for generating a drive signal having given phase and frequency characteristics;
   a plurality of light emitting diodes arranged in a plurality of LED banks, wherein each LED bank comprises a plurality of light emitting diodes connected in series to the circuitry to receive the drive signal and wherein the plurality of LED banks are arranged on a circuit board in a dispersed fashion such that a bank failure would have minimal impact on the distribution of the illumination; and
   a switching stage for simultaneously activating the plurality of LED banks such that the LED banks generate the modulated light according to the phase and frequency characteristics of the drive signal.

2. The illumination device as claimed in claim 1 wherein the plurality of LED banks are arranged on a circuit board with the light emitting diodes in a offset placement pattern to provide a more uniform distribution of the output illumination.

3. The illumination device as claimed in claim 1 wherein the light emitting diodes have a peak emission in the infrared region of the spectrum.

4. A light emitting diode (LED) illumination device for generating modulated light for a scannerless range imaging system in response to an exposure control signal, said illumination device comprising:
   an interface circuit for generating a modulating signal in response to the exposure control signal, said modulating signal having given phase and frequency characteristics;
   a plurality of drive circuits for generating a plurality of drive signals from the modulating signal, whereby each drive signal has the given phase and frequency characteristics; and
   a plurality of light emitting diodes arranged in a plurality of LED banks, wherein each LED bank comprises a smaller plurality of light emitting diodes connected in series to a given one of the drive circuits to generate the modulated light according to the phase and frequency characteristics of the modulating signal.

5. The illumination device as claimed in claim 4 further comprising a switching stage responsive to the exposure control signal for activating the plurality of drive circuits, thereby activating the plurality of LED banks such that they generate the modulated light according to the phase and frequency characteristics of the modulating signal.

6. A light emitting diode (LED) illumination device for generating modulated light for a scannerless range imaging system in response to an exposure control signal, said illumination device comprising:
   a signal conditioning circuit for processing the exposure control signal into a received clock signal having given phase and frequency characteristics;
   an interface circuit for converting the received clock signal into a sinusoidal modulating signal having the given phase and frequency characteristics;
   an LED bank comprising a plurality of light emitting diodes connected in series;
   a drive circuit for generating a drive signal from the modulating signal for the series-connected light emitting diodes in the LED bank, whereby the drive signal has the given phase and frequency characteristics;
   means for mounting a plurality of LED banks in a predetermined illumination pattern, wherein each LED bank includes its own series-connected drive circuit and wherein the mounting means arranges the LED banks on a circuit board in a dispersed fashion such that a bank failure would have minimal impact on the distribution of the illumination; and
   a switching stage responsive to the received clock signal for activating the plurality of light emitting diode banks such that they generate the modulated light according to the given phase and frequency characteristics.

7. The illumination device as claimed in claim 6 wherein the mounting means arranges the LED banks on a circuit board with the light emitting diodes in a offset placement pattern to provide a more uniform distribution of the output illumination.

8. A light emitting diode (LED) illumination device for illuminating a scene for a scannerless range imaging system, said illumination device comprising:
   circuitry for generating a drive signal having given phase and frequency characteristics;
   a plurality of light emitting diodes connected to the circuitry to receive the drive signal and illuminate the scene with modulated light in the infrared region of the spectrum having the phase and frequency characteristics of the drive signal;

a wide band illumination system for illuminating the scene with unmodulated light, said wide band illumination system comprising a second plurality of light emitting diodes having peak emissions in the visible region of the spectrum; and a switching stage for activating the plurality of light emitting diodes and the wide band illumination system such that they generate their respective light during different intervals.

9. The illumination device as claimed in claim 8 wherein the second plurality of light emitting diodes comprises a plurality of two or more types of visible light diodes emitting in at least two regions of the visible spectrum, and said two or more types of visible light diodes are arrayed in a repetitive pattern including the infrared diodes.

10. The illumination device as claimed in claim 9 wherein the visible light diodes are red, green and blue emitting diodes.

11. A scannerless range imaging camera system for capturing range information from a scene, said system comprising:

(a) a camera body including an image responsive element for capturing image light from the scene, a flash unit connection and a lens mount;

(b) a light emitting diode (LED) illumination device detachably connected to the flash unit connection of the camera body, said illumination device including an LED illumination section having a plurality of LEDs, an interface section for developing an LED modulating signal and an LED driver section for converting the LED modulating signal into a drive signal for the LEDs, whereby the LED illumination section controllably illuminates the scene with modulated illumination, and some of the modulated illumination is reflected from objects in the scene;

(c) an optical component detachably connected to lens mount of the camera body, said optical component establishing an optical path for directing reflected image light, including the modulated illumination, toward the image responsive element; and (d) a modulating element operative in the optical component to modulate the reflected image light with a modulating signal, thereby generating a processed light component captured by the image responsive element with phase data indicative of range information.

12. The range imaging system as claimed in claim 11 wherein the modulating element is a micro-channel plate.

13. The range imaging system as claimed in claim 11 wherein the modulating signal has the same modulating frequency as the LED modulating signal applied to the illumination system.

14. The range imaging system as claimed in claim 11 wherein the image responsive element captures a plurality of images of the reflected modulated illumination, wherein each image incorporates the effect of a predetermined modulation frequency together with a phase offset unique for each image.

15. The range imaging system as claimed in claim 14 wherein each unique phase offset $\theta$ is given by $\theta_i = 2\pi i/3$; $i=0, 1, 2$.

16. The range imaging system as claimed in claim 11 wherein the image responsive element is a photographic film.

17. The range imaging system as claimed in claim 11 wherein the image responsive element is a digital image sensor.

18. A light emitting diode (LED) illumination device for generating modulated light for a scannerless range imaging system in response to an exposure control signal, said illumination device comprising:

a signal conditioning circuit for processing the exposure control signal into a received clock signal having given phase and frequency characteristics;

an interface circuit for converting the received clock signal into a sinusoidal drive signal having the given phase and frequency characteristics, said interface circuit activated only when the received clock signal is present for more than a predetermined time period;

a plurality of light emitting diodes arranged in a plurality of LED banks, wherein each LED bank comprises a plurality of light emitting diodes connected in series to the circuitry to receive the drive signal and generate modulated light and wherein the plurality of LED banks are arranged on a circuit board in a dispersed fashion such that a bank failure would have minimal impact on the distribution of the illumination;

a controlled angle diffusion sheet positioned in front of the LED banks to spread the modulated light across a desired field of view; and a switching stage for simultaneously activating the plurality of LED banks such that the LED banks generate the modulated light according to the phase and frequency characteristics of the drive signal.

19. The illumination device as claimed in claim 18 wherein the plurality of LED banks are arranged on a circuit board with the light emitting diodes in a offset placement pattern to provide a more uniform distribution of the output illumination.

20. The illumination device as claimed in claim 18 wherein the light emitting diodes have a peak emission in the infrared region of the spectrum.

21. The illumination device as claimed in claim 18 wherein the controlled angle diffusion plate provides a controlled angle of diffusion of less than about 10 degrees.

22. A light emitting diode (LED) illumination device for generating modulated light for a scannerless range imaging system, said illumination device comprising:

circuitry for generating a drive signal having given phase and frequency characteristics;

a plurality of light emitting diodes arranged in a plurality of LED banks, wherein each LED bank comprises a plurality of light emitting diodes connected in series to the circuitry to receive the drive signal and wherein the plurality of LED banks are arranged on a circuit board with the light emitting diodes in a offset placement pattern to provide a more uniform distribution of the output illumination; and a switching stage for simultaneously activating the plurality of LED banks such that the LED banks generate the modulated light according to the phase and frequency characteristics of the drive signal.

23. A light emitting diode (LED) illumination device for generating modulated light for a scannerless range imaging system in response to an exposure control signal, said illumination device comprising:

a signal conditioning circuit for processing the exposure control signal into a received clock signal having given phase and frequency characteristics;

an interface circuit for converting the received clock signal into a sinusoidal modulating signal having the given phase and frequency characteristics;

an LED bank comprising a plurality of light emitting diodes connected in series;

a drive circuit for generating a drive signal from the modulating signal for the series-connected light emitting diodes in the LED bank, whereby the drive signal has the given phase and frequency characteristics;

means for mounting a plurality of LED banks in a predetermined illumination pattern, wherein each LED bank includes its own series-connected drive circuit and wherein the mounting means arranges the LED banks on a circuit board with the light emitting diodes in an offset placement pattern to provide a more uniform distribution of the output illumination; and a switching stage responsive to the received clock signal for activating the plurality of light emitting diode banks such that they generate the modulated light according to the given phase and frequency characteristics.

24. A light emitting diode (LED) illumination device for generating modulated light for a scannerless range imaging system in response to an exposure control signal, said illumination device comprising:

a signal conditioning circuit for processing the exposure control signal into a received clock signal having given phase and frequency characteristics;

an interface circuit for converting the received clock signal into a sinusoidal drive signal having the given phase and frequency characteristics, said interface circuit activated only when the received clock signal is present for more than a predetermined time period;

a plurality of light emitting diodes arranged in a plurality of LED banks, wherein each LED bank comprises a plurality of light emitting diodes connected in series to the circuitry to receive the drive signal and generate modulated light and wherein the plurality of LED banks are arranged on a circuit board with the light emitting diodes in an offset placement pattern to provide a more uniform distribution of the output illumination;

a controlled angle diffusion sheet positioned in front of the LED banks to spread the modulated light across a desired field of view; and a switching stage for simultaneously activating the plurality of LED banks such that the LED banks generate the modulated light according to the phase and frequency characteristics of the drive signal.

* * * * *